United States Patent
Ma

(10) Patent No.: US 12,197,371 B2
(45) Date of Patent: Jan. 14, 2025

(54) DATA COLLECTION SYSTEM AND METHOD

(71) Applicant: Fulian Precision Electronics (Tianjin) Co., LTD., Tianjin (CN)

(72) Inventor: Teng-Fei Ma, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 181 days.

(21) Appl. No.: 18/105,155

(22) Filed: Feb. 2, 2023

(65) Prior Publication Data

US 2023/0401168 A1   Dec. 14, 2023

(30) Foreign Application Priority Data

Jun. 13, 2022   (CN) .......................... 202210665283.6

(51) Int. Cl.
*G06F 13/40*   (2006.01)
*G06F 13/42*   (2006.01)

(52) U.S. Cl.
CPC ...... *G06F 13/4022* (2013.01); *G06F 13/4282* (2013.01)

(58) Field of Classification Search
CPC .......................... G06F 13/4022; G06F 13/4282
See application file for complete search history.

(56) References Cited

U.S. PATENT DOCUMENTS

2009/0163140 A1* 6/2009 Packham ................ H04L 67/02
455/557

FOREIGN PATENT DOCUMENTS

| CN | 106952464 A | * | 7/2017 |
| CN | 209659348 U | * | 11/2019 |
| TW | 201822021 A |   | 6/2018 |

OTHER PUBLICATIONS

Translation of CN-106952464-A (Year: 2017).*
Translation of CN-209659348-U (Year: 2019).*

* cited by examiner

*Primary Examiner* — Henry Tsai
*Assistant Examiner* — John B Roche
(74) *Attorney, Agent, or Firm* — ScienBiziP, P.C.

(57) ABSTRACT

The present disclosure provides a data collection system and method. The data collection system includes a microcontroller module, a switch and a storage module. The microcontroller module sends protocol information to the switch, configures a port of the switch, and sends control instruction to the switch. The switch receives the control instruction and transmits data to the microcontroller module according to the control instruction. The microcontroller module processes the data transmitted by the switch and transmits processed data to the storage module. The storage module receives the processed data and save the processed data. The data collection system is easy to deploy, improves production efficiency, simplifies the operation steps of data collection, and reduces the technical threshold of users.

17 Claims, 2 Drawing Sheets

DATA COLLECTION SYSTEM AND METHOD

FIELD

The present disclosure relates to the technical field of data collection, in particular to a data collection system and method.

BACKGROUND

The method of collecting data in the high-speed serial component interconnect express switch (PCIe switch) is to connect the PCIe switch to the serial port of the computer by using a serial port line, and at the same time, use the software tools provided by the manufacturer on the computer to wake up the interface status of the PCIe switch and trigger the data transmission. After the data transmission is completed, the computer copies and pastes the received data from the PCIe switch device to the file system to complete the data collection of the PCIe switch device. In the above described methods, there are many technical processes and cumbersome operations, and operator need to be specially trained, because computers and specific software and accessories are required. As a result, it is difficult and costly to deploy the above described methods to the production line.

Therefore, improvement is desired.

DETAILED DESCRIPTION

Unless otherwise defined, all technical and scientific terms used herein have the same meanings as those commonly understood by those skilled in the technical field of the present disclosure. The terms used in the description of the present disclosure herein are only for the purpose of describing specific embodiments and are not intended to limit the present disclosure.

In the embodiment of the present disclosure, words such as "first" and "second" are only used to distinguish different objects and cannot be understood as indicating or implying relative importance or indicating or implying order. For example, the first application, the second application, and the like are used to distinguish different applications, not to describe the specific order of applications. The features defined as "first" and "second" can explicitly or implicitly include one or more of these features.

Some embodiments of the present disclosure are described in detail below in combination with the accompanying drawings, without conflict, the following embodiments and the features in the embodiments can be combined with each other.

Figure 1:
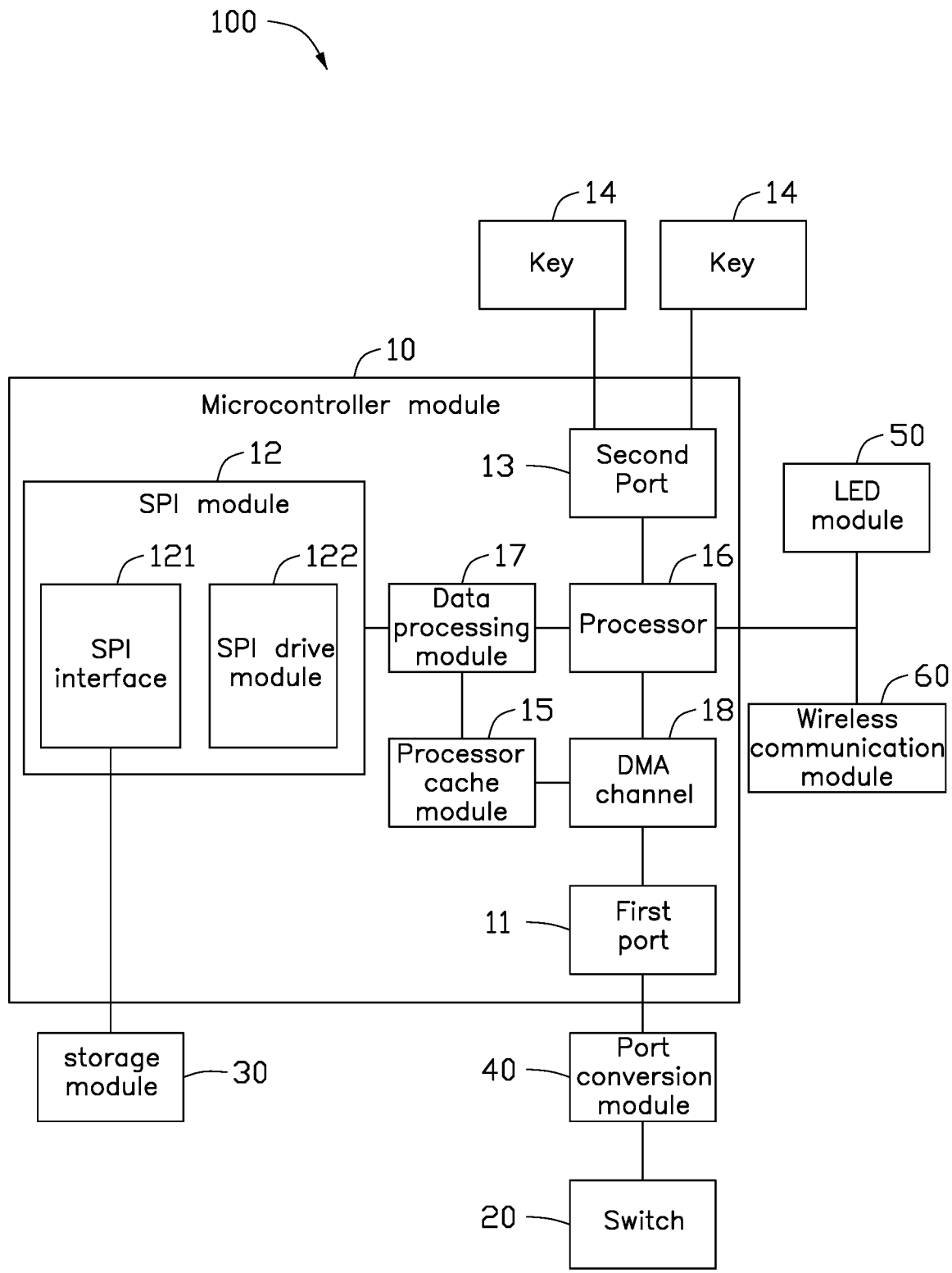
FIG. 1 is a schematic diagram of a data collection system according to an embodiment of the present disclosure.

FIG. 1 illustrates a data collection system 100 in accordance with an embodiment of the present disclosure.

The data collection system 100 includes a microcontroller module 10, a switch 20, a storage module 30, and a port conversion module 40. The microcontroller module 10 is electrically connected to the switch 20 through the port conversion module 40, and the storage module 30 is electrically connected to the microcontroller module 10. The microcontroller module 10 is used to receive the data in the switch 20, process the received data, and transmit the data to the storage module 30 for storage, so as to realize the data collection of the switch 20.

In some embodiments, the microcontroller module 10 can be, but is not limited to, a STM32Fmicrocontroller module 103C8T6 microcontroller, and the storage module 30 can be a micro SD card.

The microcontroller module 10 includes a first port 11, the first port 11 can optionally be a Universal Asynchronous Receiver/Transmitter (UART) on the microcontroller module 10. The port conversion module 40 is electrically connected between the switch 20 and the first port 11.

The port conversion module 40 is used to realize the adaptation between the first port 11 of the microcontroller module 10 and the port of the switch 20. In some embodiments, the transistor-transistor logic (TTL) level of the first port 11 is inconsistent with the TTL level of port of the switch 20. For example, the TTL level of the first port 11 can be 1.8V (volts), the TTL level of the port of the switch 20 can be 3.3V, and the port conversion module 40 can be a port converter that converts 1.8V TTL to 3.3V TTL.

The microcontroller module 10 further includes a serial peripheral interface (SPI) module 12. The microcontroller module 10 is electrically connected to the storage module 30 through the SPI module 12, and then the microcontroller module 10 transmits data to the storage module 30 through the SPI module 12. The SPI module 12 includes a SPI interface 121 and a SPI drive module 122. The SPI interface 121 is connected to the storage module 30, and the SPI drive module 122 is used to send the drive signal to the storage module 30 to drive the communication connection between the storage module 30 and the SPI module 12, so as to realize the communication connection between the microcontroller module 10 and the storage module 30.

The microcontroller module 10 includes a second port 13, the second port 13 can be a general-purpose input/output (GPIO) on the microcontroller module 10. The second port 13 is used to install the key 14. In some embodiments, the second port 13 on the microcontroller module 10 is powered up and connected to multiple keys 14, and the key 14 is pressed to trigger the data collection system 100 to collect the data.

In some embodiments, the staff can press different keys 14 according to different needs to collect various data in the switch 20, such as the log data of the switch 20 and the interface status of the switch 20.

The microcontroller module 10 further includes a processor cache module 15, a processor 16, a data processing module 17 and a direct memory access (DMA) channel 18.

The processor cache module 15 is used to cache the data transmitted by the switch 20 received by the microcontroller module 10. The data processing module 17 is used to process (for example, package into a file) the data cached in the processor cache module 15.

In some embodiments, the processor cache module 15 is further used to store program code or multiple instructions, as well as various data. The processor 16 is used to call the program code and various data stored in the processor cache module 15, and then perform various functions and process the data of the microcontroller module 10.

The key 14 is connected to the processor 16 through the second port 13. When the data collection system 100 collects data, the corresponding key 14 is pressed to trigger the processor 16 to call the corresponding protocol information from the processor cache module 15, and the data collection system 100 transmits the protocol information to the switch 20 through the first port 11 and the port conversion module 40 to configure the port of the switch 20.

After the port configuration of the switch 20 is completed, the processor 16 calls the command line interface (CLI) instruction from the processor cache module 15 and transmits the CLI instruction to the switch 20 through the first port 11 and the port conversion module 40, so as to control the switch 20 to start data transmission, and then obtain the corresponding data in the switch 20.

The DMA channel 18 is electrically connected between the first port 11 and the processor cache module 15. The DMA channel 18 is used to quickly transmit the data received by the first port 11 to the processor cache module 15.

When the microcontroller module 10 receives the data transmitted by the switch 20, the data transmitted by the switch 20 is transmitted to the first port 11 through the port conversion module and the data is transmitted to the processor cache module 15 through the DMA channel 18, and then the processor cache module 15 receives the data transmitted by the switch 20 and caches the data.

The DMA channel 18 is connected between the first port 11 and the processor 16. In some embodiments, the processor 16 includes a clock device to detect whether the first port 11 and the DMA channel 18 are transmitting data. When the clock device in the processor 16 detects that the first port 11 and the DMA channel 18 are not transmitting data, an idle interrupt signal is generated.

When the processor 16 generates an idle interrupt signal, the processor 16 sends the idle interrupt signal to the data processing module 17, to control the data processing module 17 to process the data cached in the processor cache module 15. When the data processing module 17 receives the idle interrupt signal sent by the processor 16, the data processing module 17 processes the data cached in the processor cache module 15 and transmits the processed data to the SPI module 12.

When the SPI module 12 receives the data processed by the data processing module 17, the processor 16 controls the SPI drive module 122 to send a drive signal to the storage module 30, to drive the storage module 30 to communicate with the SPI module 12, the microcontroller module 10 transmits the processed data to the storage module 30 through the SPI interface 121, and the storage module 30 receives the data transmitted by the microcontroller module 10 and saves the data.

When all the cached data in processor cache module 15 is transmitted to the storage module 30, the processor 16 controls the processor cache module 15 to clear the cached data and perform function initialization to wait for the next data collection.

In some embodiments, the microcontroller module 10 is further provided with a light-emitting diode (LED) module 50, and the LED module 50 is used to display the progress of the data collection. For example, when the microcontroller module 10 receives the data of the switch 20 and transmits the received data to the storage module 30 for storage, the processor 16 controls the LED module 50 to keep on. When the data storage is completed, the processor 16 controls the LED module 50 not to emit light. In some embodiments, when the key 14 is pressed, the processor 16 controls the LED module 50 to emit a brief flashing light, and the progress of the data collection can be known by observing the LED module 50.

In some embodiments, the microcontroller module 10 is further provided with a wireless communication module 60, the wireless communication module can be a Wi-Fi module or a Bluetooth module. The microcontroller module 10 can be connected to the mobile terminal devices (such as tablets, laptops, mobile phones, personal digital assistants (PDAs) and other electronic communication products) through the wireless communication module 60, the present disclosure can control the microcontroller module 10 to receive and transmit the data through remote operation on the mobile terminal device, and control the operation of the data collection system 100.

Figure 2:
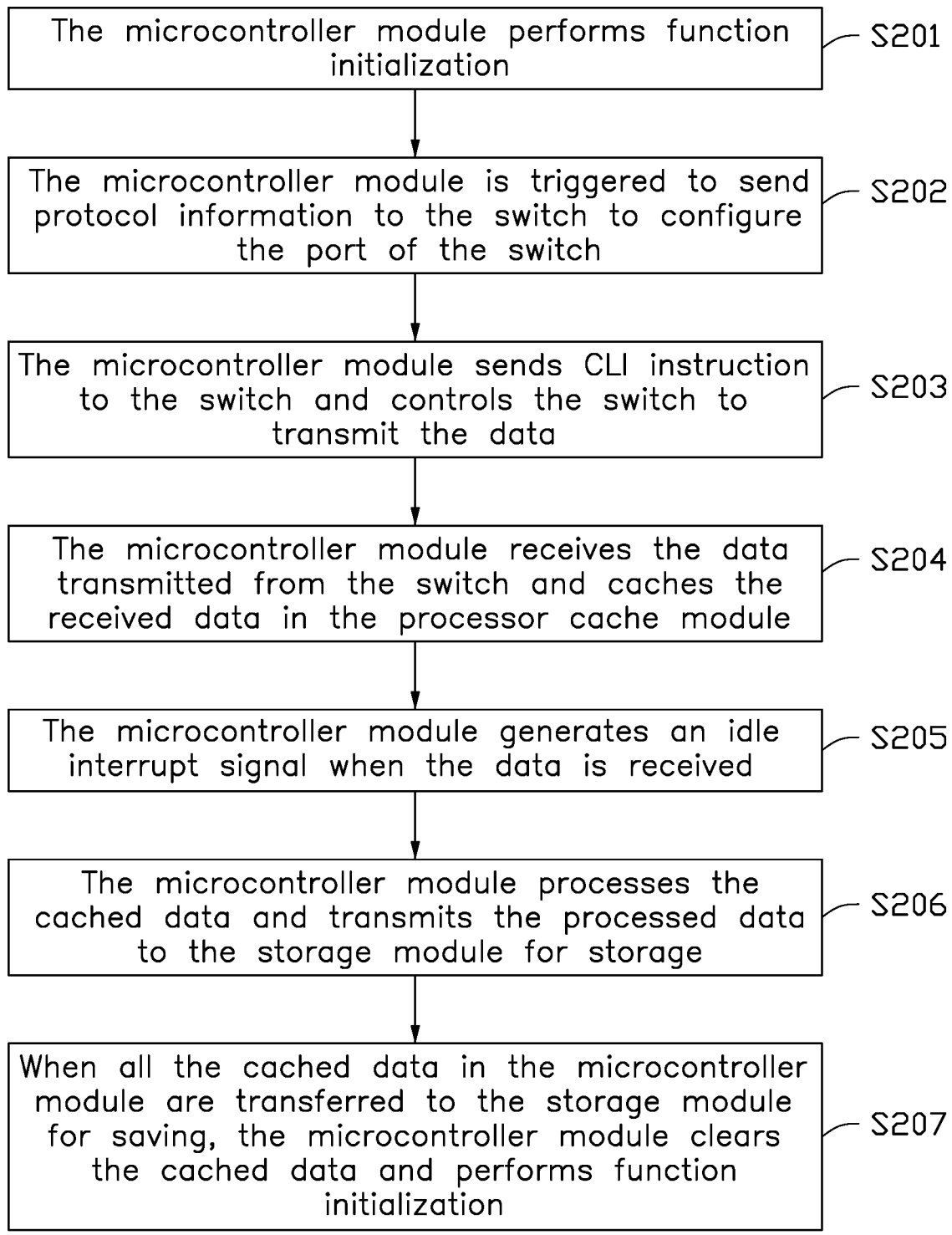
FIG. 2 is a flowchart of a data collection method according to an embodiment of the present disclosure.

FIG. 2 is a flowchart of a data collection method according to an embodiment of the present disclosure. The data collection method can be applied to the data collection system. The data collection method can include the following steps:

At step S201: the microcontroller module 10 performs function initialization.

The function initialization of the microcontroller module 10 can include key interrupt signal initialization, LED module initialization, port initialization, SPI driver initialization, DMA initialization, idle interrupt signal initialization, data processing module initialization and storage module initialization.

At step S202: the microcontroller module 10 is triggered to send protocol information to the switch 20 to configure the port of the switch 20.

In the embodiment, the corresponding key 14 is pressed to trigger the processor 16 to call the corresponding protocol information from the processor cache module 15, and the protocol information is transmitted to the switch 20 through the first port 11 and the port conversion module 40 to configure the port of the switch 20.

At step S203: the microcontroller module 10 sends CLI instruction to the switch 20 and controls the switch 20 to transmit the data.

After the port configuration of the switch 20 is completed, the processor 16 calls the CLI instruction from the processor cache module 15 and transmits the CLI instruction to the switch 20 through the first port 11 and the port conversion module 40, so as to control the switch 20 to start data transmission, and then obtain the corresponding data in the switch 20.

At step S204: the microcontroller module 10 receives the data transmitted from the switch and caches the received data in the processor cache module 15.

The DMA channel 18 is electrically connected between the first port 11 and the processor cache module 15. The switch 20 transmits the data to the first port 11 through the port conversion module 40, and then to the processor cache module 15 through the DMA channel 18 for caching.

At step S205: the microcontroller module 10 generates an idle interrupt signal when the data is received.

In some embodiments, the processor 16 includes a clock device to detect whether the first port 11 and the DMA channel 18 are transmitting data. When the clock device in the processor 16 detects that the first port 11 and the DMA channel 18 are not transmitting data, an idle interrupt signal is generated.

When the processor 16 generates an idle interrupt signal, the processor 16 sends the idle interrupt signal to the data processing module 17, to control the data processing module 17 to process the data cached in the processor cache module 15.

At step S206: the microcontroller module 10 processes the cached data and transmits the processed data to the storage module 30 for storage.

When the data processing module 17 receives the idle interrupt signal sent by the processor 16, the data processing module 17 packs and integrates the data cached in the processor cache module 15 and transmits the packed and integrated data to the SPI module 12.

In some embodiments, the microcontroller module 10 is connected to the storage module through the SPI interface 121. When the SPI module 12 receives the data processed by the data processing module 17, the processor 16 controls the SPI drive module 122 to send a drive signal to the storage module 30, to drive the communication connection between the storage module 30 and the SPI module 12, and the microcontroller module 10 transmits the data to the storage module 30 through the SPI module 12 for saving.

At step S207: when all the cached data in the microcontroller module 10 are transferred to the storage module 30 for saving, the microcontroller module 10 clears the cached data and performs function initialization.

The microcontroller module 10 clears the data stored in the processor cache module 15, performs function initialization, and continues to wait for the key interrupt signal for the next data collection.

The data collection system and method provided in the present disclosure receives the data of the switch 20, caches and processes it by using the DMA channel 18 through the microcontroller module 10 and triggering the idle interrupt signal, the microcontroller module 10 further drives the storage module 30 through the SPI module 12 to transmit the received switch 20 data to the storage module 30 for saving, to realize the data collection of the switch 20. The microcontroller module 10 is small and easy to deploy, thus reducing the time cost required for deployment and improving production efficiency. The present disclosure can collect data by pressing the key 14 set on the microcontroller module 10, which reduces the technical threshold of users. The present disclosure can be operated remotely by installing the wireless communication module 60 on the microcontroller module 10 to collect data.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A data collection system comprising a microcontroller module, a switch and a storage module; wherein:
   the microcontroller module is configured to send protocol information to the switch, configure a port of the switch, and send a control instruction to the switch;
   the switch is configured to receive the control instruction and transmit data to the microcontroller module according to the control instruction; and
   the microcontroller module is configured to process the data transmitted by the switch and transmit processed data to the storage module; and
   the storage module is configured to receive the processed data and save the processed data.

2. The data collection system of claim 1, further comprising a port conversion module, wherein the microcontroller module comprises a first port, the port conversion module is configured to adapt between the first port and the port of the switch.

3. The data collection system of claim 1, wherein the microcontroller module comprises a serial peripheral interface (SPI) module, and the SPI module comprises a SPI interface and a SPI drive module, the SPI interface is connected to the storage module, the SPI drive module is configured to send a drive signal to the storage module to drive a communication connection between the storage module and the SPI module, and the microcontroller module transmits the processed data to the storage module through the SPI module.

4. The data collection system of claim 1, wherein the microcontroller module comprises a second port, the second port is configured to electrically connect at least one key, and the at least one key is configured to trigger the microcontroller module to output the protocol information to the switch, to configure the port of the switch.

5. The data collection system of claim 4, wherein when the port of the switch is configured, the microcontroller module sends a command line interface (CLI) instruction to the switch to control the switch to transmit the data.

6. The data collection system of claim 1, wherein the microcontroller module further comprises a processor cache module and a data processing module, the processor cache module is configured to cache the data received by the microcontroller module from the switch, the data processing module is configured to process the data cached in the processor cache module.

7. The data collection system of claim 6, wherein the microcontroller module further comprises a direct memory access (DMA) channel and a processor, the DMA channel is connected to the first port and the processor, the processor is configured to detect whether the first port and the DMA channel are transmitting data.

8. The data collection system of claim 7, wherein when the processor detects that the first port and the DMA channel are not transmitting data, the processor generates an idle interrupt signal and sends the idle interrupt signal to the data processing module to control the data processing module to process the data cached in the processor cache module.

9. The data collection system of claim 8, wherein the DMA channel is connected between the first port and the processor cache module, the DMA channel is configured to quickly transmit the data received by the first port to the processor cache module.

10. The data collection system of claim 9, wherein when the data processing module receives the idle interrupt signal, the data processing module processes the data cached in the processor cache module and transmits the processed data to the SPI module.

11. The data collection system of claim 10, wherein the processor is configured to control the SPI drive module to send the drive signal to the storage module and drive the communication connection between the storage module and the SPI module after the SPI module receives the processed data from the data processing module.

12. The data collection system of claim 11, wherein after the communication connection between the storage module and the SPI module is formed, the SPI module transmits the processed data to the storage module for storage.

13. A data collection method applicable to a data collection system, the data collection system comprising a microcontroller module, a switch and a storage module, and the data collection method comprising:
   the microcontroller module configuring a port of the switch and controlling the switch to transmit data to the microcontroller module;
   the microcontroller module processing the data transmitted by the switch and transmitting processed data to the storage module; and
   the storage module receiving the processed data and saving the processed data.

14. The data collection method of claim 13, further comprising:

triggering the microcontroller module to send a protocol information to the switch and configuring the port of the switch;

the microcontroller module sending a command line interface (CLI) instruction to the switch to control the switch to transmit the data when the port the switch is configured.

15. The data collection method of claim 14, further comprising:

the microcontroller module receiving the data transmitted by the switch and caching the data in a processor cache module;

a processor generating an idle interrupt signal and sending the idle interrupt signal to a data processing module to control the data processing module to process the data cached in the processor cache module; and the data processing module processing the data cached in the processor cache module and transmitting the processed data to a SPI module when the data processing module receives the idle interrupt signal.

16. The data collection method of claim 15, further comprising:

controlling a SPI drive module to send a drive signal to the storage module, and driving the storage module to form a communication connection with the SPI module; the SPI module sending the processed data to the storage module; and the storage module receiving the processed data and saving the processed data.

17. The data collection method of claim 16, wherein when the processed data in the SPI module is transferred to the storage module, the microcontroller module clears a cached data and performs function initialization.

* * * * *